(12) United States Patent
Kunisada et al.

(10) Patent No.: US 6,313,577 B1
(45) Date of Patent: Nov. 6, 2001

(54) OPTICAL ARTICLES AND CATHODE-RAY TUBE USING THE SAME

(75) Inventors: Terufusa Kunisada; Etsuo Ogino; Chihiro Sakai; Koji Nakanishi; Yasunori Taninaka, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/397,116

(22) Filed: Sep. 16, 1999

(30) Foreign Application Priority Data

Sep. 22, 1998 (JP) .................................. 10-267600
Sep. 22, 1998 (JP) .................................. 10-267600

(51) Int. Cl.[7] .................................................. H01J 31/00
(52) U.S. Cl. ........................................... 313/479; 313/112
(58) Field of Search ..................... 313/461, 473, 313/474, 477 R, 479, 112; 359/359

Primary Examiner—Vip Patel

(74) Attorney, Agent, or Firm—Sughrue, Mion, Zinn, Macpeak & Seas, PLLC

(57) ABSTRACT

A face panel for a cathode-ray tube is coated with an antireflection film by forming, on the outer surface thereof in this order, a 44.9 nm-thick praseodymium titanate film as a first layer, a 4.9 nm-thick film of a nickel-iron alloy as a second layer, a 53.4 nm-thick praseodymium titanate film as a third layer, a 3.9 nm-thick film of a nickel-iron alloy as a fourth layer, a 20.6 nm-thick praseodymium titanate film as a fifth layer, and an 84.7 nm-thick magnesium fluoride film as a sixth layer. This coated face panel is free from the problem that conventional cathode-ray tube face panels coated on the outer surface with an antireflection film comprising superposed metal films and transparent dielectric films make the cathode-ray tubes exhibit double images although effective in diminishing the reflection of external light on the surface of the cathode-ray tubes and in enhancing display contrast. The cathode-ray tube using the face panel coated with the specific antireflection film does not exhibit double images, is prevented from suffering static buildup on its surface or from reflecting external light thereon, and can attain higher image contrast.

20 Claims, 6 Drawing Sheets

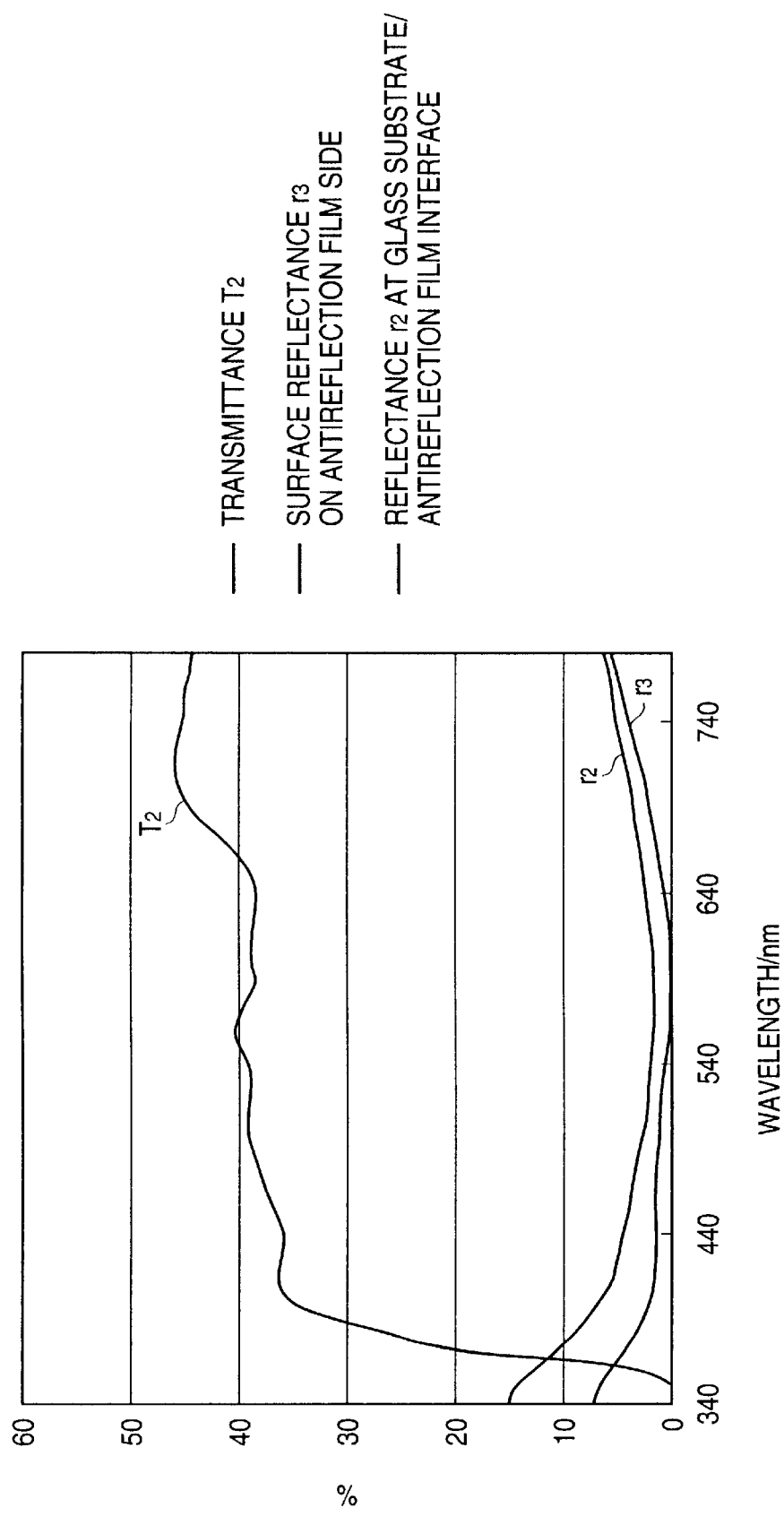

OPTICAL ARTICLES AND CATHODE-RAY TUBE USING THE SAME

FIELD OF THE INVENTION

The present invention relates to glass articles coated with an antireflection film combining electrical conductivity and light absorbing properties. More particularly, this invention relates to face panels made of glass for cathode-ray tubes or to glass plates to be bonded to such face panels.

BACKGROUND OF THE INVENTION

In displays employing a cathode-ray tube, such as television receivers, measures are being taken to diminish the reflection of external light from the display surface to improve display quality. Since a high voltage is used in these displays employing a cathode-ray tube because of the use of an electron gun therein, the display surface is electrostatically charged and thus attracts dust particles floating in the air. Measures are hence being taken to impart electrical conductivity to the surface of a cathode-ray tube in order to prevent the electrostatic charging of the display surface. Furthermore, electron rays accelerated by a high voltage generate electromagnetic wave and this electromagnetic wave may exert an adverse influence on the human body. Displays are hence being produced in which the front side of the display area is coated with a conductive film for electromagnetic wave shielding. Specifically, such displays are produced by a technique in which a glass plate coated with a conductive antireflection film is bonded with a resin to the outer surface of the face panel of a cathode-ray tube, or by a technique in which the outer surface of a face panel itself is directly coated with a conductive antireflection film.

Examples of such glass articles used for the purpose of improving the display quality of cathode-ray tubes include the multilayer structure represented by glass plate/ITO/praseodymium titanate/magnesium fluoride/praseodymium titanate/magnesium fluoride as disclosed in JP-A-6-263483. (The term "JP-A" as used herein means an "unexamined published Japanese patent application".)

Examples of conductive antireflection films comprising superposed layers of a metal and a transparent oxide include the multilayer structure represented by glass plate/metal/titanium oxide/silicon oxide as disclosed in JP-A-64-70701, the multilayer structure represented by glass plate/magnesium fluoride/metal/titanium oxide/magnesium fluoride as disclosed in JP-A-1-180333, and the multilayer structure represented by glass/praseodymium titanate/metal/praseodymium titanate/magnesium fluoride as disclosed in Japanese Patent 2,565,538. The metal layers disclosed in these references are constituted of stainless steel, titanium, chromium, zirconium, molybdenum, nickel, chromium alloys, etc.

JP-A-1-200952 discloses multilayer structures having four layers including two metal layers, such as that represented by glass plate/stainless steel/praseodymium titanate/stainless steel/magnesium fluoride.

Furthermore, a conductive antireflection film formed by superposing a nonmetallic light-absorbing film and transparent dielectric films is disclosed in JP-A-9-156964. This multilayer structure is represented by glass plate/titanium nitride/silicon nitride/silicon dioxide.

The above-described antireflection films composed of superposed layers comprising one or more light-absorbing films made of a metal or metal nitride and transparent dielectric films are known to be effective in reducing transmittance and enhancing display contrast when directly or indirectly disposed on the front surface of a cathode-ray tube.

However, the antireflection film disclosed in JP-A-6-263483 does not absorb light because all the layers are constituted of a transparent oxide. Consequently, when this antireflection film is disposed on the front side of a cathode-ray tube, it does not function to enhance display contrast to make the display easy to view, although it has electrical conductivity and a high transmittance.

On the other hand, in the prior art conductive antireflection films comprising superposed layers of a metal and a transparent oxide, transmittance can be controlled by regulating the thickness of the metal layer. In this manner, the transmittance thereof can be regulated to a value in the range of from 30 to 50%, which range is advantageous for enhancing display contrast. However, these antireflection films have found to have a problem that when the thicknesses of the constituent films are regulated so as to reduce the reflectance of external light on the outer surface of the antireflection film, the reflectance at the interface between the transparent substrate and the antireflection film is increased.

A high reflectance at the interface between the glass and the antireflection film in a cathode-ray tube poses a problem that the cathode-ray tube display exhibits double images in each of the case where the cathode-ray tube employs a glass panel directly coated with the antireflection film and the case where the cathode-ray tube employs a face panel to which a glass substrate coated with the antireflection film has been bonded. This problem of image doubling is severe especially in cathode-ray tubes in which the face panel itself has a high internal transmittance. The prior art antireflection film disclosed in JP-A-9-156964, composed of superposed layers comprising a metal nitride film and transparent dielectric films, also has the above problem.

The face panels of cathode-ray tubes tend to become flatter and larger. Accordingly, the glass articles for use as such face panels are designed so that the peripheral parts thereof have a far larger thickness than the central part thereof in order to maintain strength. Although the above-described problem of image doubling may be eliminated by employing a glass having a reduced internal transmittance, this means has a drawback that the peripheral parts of the cathode-ray tube exhibit darker images than the central part thereof. In order for a face panel glass to have a larger thickness in its peripheral parts, which is necessary for securing mechanical strength, and to cause no difference in image brightness between the peripheral parts and the central part thereof, the glass itself should have a heightened internal transmittance. When such a face panel having a high internal transmittance is coated on the outer side with the prior art antireflection film containing a light-absorbing metal or metal nitride film, the coated panel has a high reflectance at the interface between the glass and the antireflection film to thereby pose the problem of image doubling.

SUMMARY OF THE INVENTION

One object of the present invention is to eliminate the problem of image doubling which arises, for example, when an antireflection film containing a light-absorbing film is formed on the outer surface of the face panel of a cathode-ray tube, or when a glass plate coated with an antireflection film containing a light-absorbing film is bonded to the face panel of a cathode-ray tube.

Another object of the present invention is to prevent the reflection of external light on a display surface to obtain high display contrast.

The present invention provides an optical article having antireflection coating which comprises a light-transmitting substrate having a refractive index of 1.4 to 1.7 and an antireflection film composed of superposed layers comprising, formed on the light-transmitting substrate in this order, a light-absorbing film as a first layer, a transparent dielectric film having a refractive index of 1.6 to 2.4 as a second layer, a light-absorbing film as a third layer, a transparent dielectric film having a refractive index of 1.6 to 2.4 as a fourth layer, and a transparent dielectric film having a refractive index of 1.35 to 1.5 as a fifth layer.

The values of refractive index herein mean those measured at a wavelength of 550 nm. Examples of the materials constituting the light-absorbing films include metals, alloys, and metal nitrides. The embodiment that each of two light-absorbing films is laminated by sandwiching the same between transparent dielectric films having a refractive index of 1.6 to 2.4 is important in enabling the light which has passed through the light-transmitting substrate and strikes on the antireflection film to have a reduced reflectance when reflected at the substrate/antireflection film interface. The two light-absorbing films may be made of the same or different substances.

The optical article is preferably an article wherein the transparent dielectric films respectively as the second and fourth layers each has a thickness of from 30 to 80 nm, and the transparent dielectric film as the fifth layer has a thickness of from 60 to 100 nm.

The thicknesses of the transparent dielectric films respectively as the second and fourth layers are preferably 30 nm or larger, more preferably 40 nm or larger, and are preferably 80 nm or smaller, more preferably 60 nm or smaller, from the standpoint of enabling the light which has passed through the light-transmitting substrate and strikes on the antireflection film to have a reduced reflectance in reflection at the substrate/antireflection film interface to thereby surely prevent the occurrence of double images without fail.

The thickness of the transparent dielectric film as the fifth layer is preferably 60 nm or larger, more preferably 65 nm or larger, and is preferably 100 nm or smaller, more preferably 80 nm or smaller, from the standpoint of enabling the light which has passed through the light-transmitting substrate and strikes on the antireflection film to have a reduced reflectance in reflection at the substrate/antireflection film interface to thereby prevent the occurrence of double images without fail.

The optical article is preferably an article wherein the light-absorbing films each is a film of one member or a mixture of two or more members selected from the group of metals consisting of titanium, chromium, zirconium, molybdenum, iron, niobium, tantalum, hafnium, nickel, nickel-iron alloys, and stainless steels.

Films of any of these metals and alloys or of a mixture of two or more thereof are characterized by being transparent films which are almost colorless, and hence do not impair the colors of the color images exhibited by a cathode-ray tube.

The optical article is preferably an article wherein the light-absorbing films respectively as the first and third layers, which each is constituted of a metal, each has a thickness of from 5 to 18 nm.

Thicknesses thereof smaller than 5 nm are undesirable in that the antireflection film not only has insufficient light absorbing properties to reduce the contrast of displayed images, but has impaired antistatic properties. From this standpoint, the thicknesses of the first and third layers are more preferably 6 nm or larger. On the other hand, thicknesses thereof exceeding 18 nm are undesirable in that the antireflection film has too high light absorbing properties, resulting in darkened displayed images. From this standpoint, the thicknesses of the first and third layers are more preferably 12 nm or smaller. The thickness of each light-absorbing film is preferably selected so that the optical article has a visible ray transmittance in the range of from 30 to 50%.

The optical article is preferably an article wherein at least one of the transparent dielectric films having a refractive index of from 1.6 to 2.4 is a film of chromium oxide.

The optical article is preferably an article wherein the light-absorbing films each is a film of one member or a mixture of two or more members selected from the group of metal nitrides consisting of titanium nitride, chromium nitride, zirconium nitride, hafnium nitride, and tantalum nitride.

Films of any of these metal nitrides are characterized by being transparent films which are almost colorless, and hence do not impair the colors of the color images exhibited by a cathode-ray tube.

The optical article is preferably an article wherein the light-absorbing films respectively as the first and third layers, which each is constituted of a metal nitride, each has a thickness of from 3 to 6 nm. If the thicknesses thereof are smaller than 3 nm, the antireflection film not only has insufficient light absorbing properties to reduce the contrast of displayed images, but has impaired antistatic properties. On the other hand, if the thicknesses thereof exceed 6 nm, the antireflection film absorbs too large an amount of light, resulting in darkened displayed images. The thickness of each light-absorbing film is preferably selected so that the optical article has a visible ray transmittance in the range of from 30 to 50%.

The present invention further provides an optical article having antireflection coating which comprises a light-transmitting substrate having a refractive index of 1.4 to 1.7 and an antireflection film composed of superposed layers comprising, formed on the light-transmitting substrate in this order, a transparent dielectric film having a refractive index of 1.6 to 2.4 as a first layer, a light-absorbing film as a second layer, a transparent dielectric film having a refractive index of 1.6 to 2.4 as a third layer, a light-absorbing film as a fourth layer, and a transparent dielectric film having a refractive index of 1.35 to 1.5 as a fifth layer.

The values of refractive index herein mean those measured at a wavelength of 550nm. Examples of the materials constituting the light-absorbing films include metals, alloys, and metal nitrides. The embodiment that each of two light-absorbing films is laminated by sandwiching the same between transparent dielectric films having a refractive index of 1.6 to 2.4 is important in enabling the light which has passed through the light-transmitting substrate and strikes on the antireflection film to have a reduced reflectance when reflected at the substrate/antireflection film interface. The two light-absorbing films may be made of the same or different substances.

The optical article is preferably an article which has, as a sixth layer, a transparent dielectric film having a refractive index of 1.6 to 2.4 interposed between the light-absorbing film as the fourth layer and the transparent dielectric film as the fifth layer.

The optical article is preferably an article wherein the transparent dielectric films respectively as the first and third layers each has a thickness of 30 to 80 nm, and the transparent dielectric film as the fifth layer has a thickness of 60 to 100 nm.

The thicknesses of the transparent dielectric films respectively as the first and third layers are preferably 30 nm or larger, more preferably 40 nm or larger, and are preferably 80 nm or smaller, more preferably 60 nm or smaller, from the standpoint of enabling the light which has passed through the light-transmitting substrate and strikes on the antireflection film to have a reduced reflectance in reflection at the substrate/antireflection film interface to thereby surely prevent the occurrence of double images without fail.

The thickness of the transparent dielectric film as the fifth layer is preferably 60 nm or larger, more preferably 65 nm or larger, and is preferably 100 nm or smaller, more preferably 95 nm or smaller, from the standpoint of enabling the light which has passed through the light-transmitting substrate and strikes on the antireflection film to have a reduced reflectance in reflection at the substrate/antireflection film interface to thereby prevent the occurrence of double images without fail.

The optical article is preferably an article wherein the transparent dielectric film as the sixth layer has a thickness not exceeding 100 nm.

Thicknesses exceeding 100 nm are undesirable for the transparent dielectric film as the sixth layer because the result is too high a reflectance. From the standpoint of obtaining a reduced reflectance, the thickness of the sixth layer is preferably 70 nm or smaller, more preferably 30 nm or smaller.

The optical article is preferably an article wherein the light-absorbing films each is a film of one member or a mixture of two or more members selected from the group of metals consisting of titanium, chromium, zirconium, molybdenum, iron, niobium, tantalum, hafnium, nickel, nickel-iron alloys, and stainless steels.

Films of any of these metals and alloys or of a mixture of two or more thereof are characterized by being transparent films which are almost colorless, and hence do not impair the colors of the color images exhibited by a cathode-ray tube.

The optical article is preferably an article. wherein the light-absorbing films each has a thickness of 3 to 6 nm.

The optical article is preferably an article wherein at least one of the transparent dielectric films having a refractive index of 1.6 to 2.4 is a film of chromium oxide.

Where the light-absorbing films respectively as the second and fourth layers each is a film of a metal or alloy, the thickness of each light-absorbing film is preferably 3 to 6 nm. Thicknesses thereof smaller than 3 nm are undesirable in that the antireflection film not only has insufficient light absorbing properties to reduce the contrast of displayed images, but has impaired antistatic properties. On the other hand, thicknesses thereof exceeding 6 nm are undesirable in that the antireflection film absorbs too large an amount of light, resulting in darkened displayed images. The thickness of each light-absorbing film is preferably selected so that the optical article has a visible ray transmittance in the range of 30 to 50%.

The optical article is preferably an article wherein the light-absorbing films each is a film of one member or a mixture of two or more members selected from the group of metal nitrides consisting of titanium nitride, chromium nitride, zirconium nitride, hafnium nitride, and tantalum nitride.

Films of any of these metal nitrides are characterized by being transparent films which are almost colorless, and hence do not impair the colors of the color images exhibited by a cathode-ray tube.

The optical article is preferably an article wherein the light-absorbing films each has a thickness of 5 to 18 nm.

Where the light-absorbing films respectively as the second and fourth layers each is constituted of a metal nitride, the light-absorbing films each preferably has a thickness of 5 to 18 nm. Thicknesses thereof smaller than 5 nm are undesirable in that the antireflection film not only has insufficient light absorbing properties to reduce the contrast of displayed images, but has impaired antistatic properties. From this standpoint, the thicknesses of the second and fourth layers are more preferably 6 nm or larger. On the other hand, thicknesses thereof exceeding 18 nm are undesirable in that the antireflection film absorbs too large an amount of light, resulting in darkened displayed images. From this standpoint, the thicknesses of the second and fourth layers are more preferably 12 nm or smaller. The thickness of each light-absorbing film is preferably selected so that the optical article has a visible ray transmittance in the range of from 30 to 50%.

The optical article is preferably an article wherein the light-transmitting substrate is a glass substrate.

The glass substrate is bonded with an adhesive to the outer surface of a face panel for a cathode-ray tube. Since such face panels generally have a slightly curved outer surface, the glass substrate is preferably one which has been bent so that it can be bonded to the curved surface by means of an adhesive layer having an even thickness. The glass substrate may be a colorless or colored glass plate. The composition of the glass is not particularly limited, and usable examples thereof include a soda-lime silicate composition, borosilicate composition, aluminosilicate composition, and alumino borosilicate composition. The glass substrate may have been toughened by air cooling. In general, a float glass having a soda-lime silicate composition is frequently used because it is inexpensive.

The optical article is preferably an article wherein the light-transmitting substrate is a face panel made of glass for a cathode-ray tube.

The optical article is preferably an article wherein the glass contains a coloring ingredient to thereby have light absorbing properties.

Examples of light-absorbing ions (coloring ions) which the glass can contain include nickel, iron, cobalt, selenium, cerium, and titanium. By incorporating at least one of these ingredients into a glass, a light-absorbing transparent glass having, e.g., a gray, green, or bronze color can be obtained. The use of a glass having light absorbing properties is preferred because this glass is effective in reducing the amount of the light which is reflected at the interface between the glass substrate and the antireflection film after having passed through the glass substrate and reached the antireflection film, as will be described later. The glass may contain other additives such as barium, strontium, antimony, zinc, and zirconium.

The present invention furthermore provides a cathoderay tube using the glass article as described above.

Examples of the transparent dielectric films having a refractive index of 1.6 to 2.4 contained in each of the optical articles according to the present invention include films of praseodymium titanate, praseodymium oxide, indium oxide, indium oxide doped with tin, niobium oxide, titanium oxide, bismuth oxide, aluminum oxide, tantalum oxide, zirconium oxide, silicon nitride, tin oxide, and chromium oxide. Examples of the transparent dielectric film having a refractive index of 1.35 to 1.5 include films of magnesium fluoride and silicon dioxide. These transparent dielectric films can be deposited by known techniques such as, e.g., vacuum evaporation, ion plating, and sputtering. The light-transmitting substrate may be a plate or film of a plastic.

Where metal films are used as the light-absorbing films in each optical article of the present invention, this optical article has a lower transmittance at longer wavelengths because metal films have higher coefficients of light absorption at longer wavelengths than at shorter wavelengths within the visible light region of 340 to 780 nm. Among the transparent dielectric films enumerated above, the chromium oxide films show slight absorption in the visible light region and absorb a larger amount of light at shorter wavelengths than at longer wavelengths. Consequently, when metal films are used as the light-absorbing films and chromium oxide films are used as the transparent dielectric films, then the antireflection film can be regulated so that the transmittance is constant throughout the visible region or is slightly higher at longer wavelengths. Namely, the difference in wavelength-dispersive properties between the two kinds of films can be utilized to control the spectral transmittance curve in some degree. From this standpoint, it is preferred to select metal films as the light-absorbing films and to select chromium oxide films as the transparent dielectric films.

BRIEF DESCRIPTION OF THE DRAWINGS

FIG. 9 is spectral curves respectively showing the transmittance $T_2$ of the optical article obtained in Example 12, the surface reflectance $r_3$ thereof on the anti reflection film side, and the reflectance $r_2$ thereof at the glass substrate/antireflection film interface.

DESCRIPTION OF SYMBOLS

Figure 1:
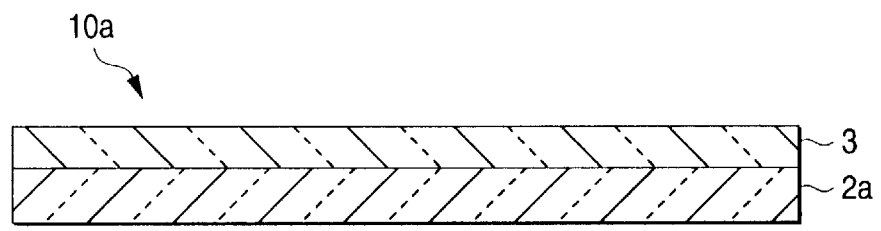
FIGS. 1(a)–1(b) are sectional views of embodiments of the optical articles according to the present invention.
Figure 1:
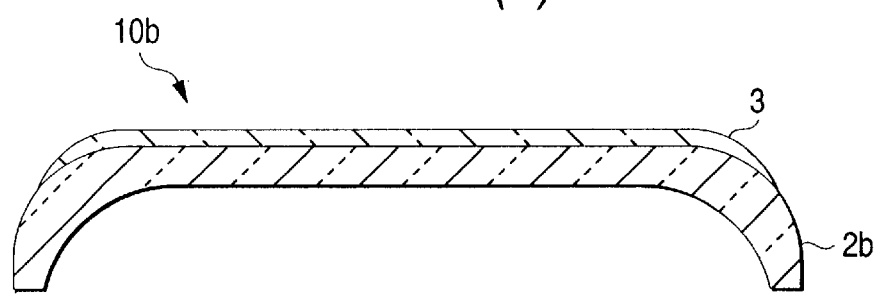

1: Fluorescent material
2: Light-transmitting substance
2a: Glass substrate
2b: Face panel made of glass
3: Antireflection film
10a: Optical article of the invention using glass substrate
10b: Optical article of the invention using face panel made of glass
11: Cathode-ray tube of the invention
12: Glass frit sealing layer
13: Electron gun unit
14: Funnel
31: Transparent dielectric film with refractive index of 1.6–2.4
32: Light-absorbing film
33: Transparent dielectric film with refractive index of 1.35–1.5

DETAILED DESCRIPTION OF THE INVENTION

In FIG. 1 are shown sectional views of embodiments of the optical articles according to the present invention. The optical article 10a shown in FIG. 1 (a) comprises a glass substrate 2a and an antireflection film 3 deposited on a surface thereof. This optical article is bonded to the face panel of a cathode-ray tube with an adhesive in such a manner that the antireflection film faces inward. As illustrated by the sectional view given in FIG. 1 (b), the optical article 10(b) as the other embodiment according to the present invention comprises the face panel made of glass 2b for a cathode-ray tube and an antireflection film 3 directly deposited on the outer surface of the panel.

Figure 2:
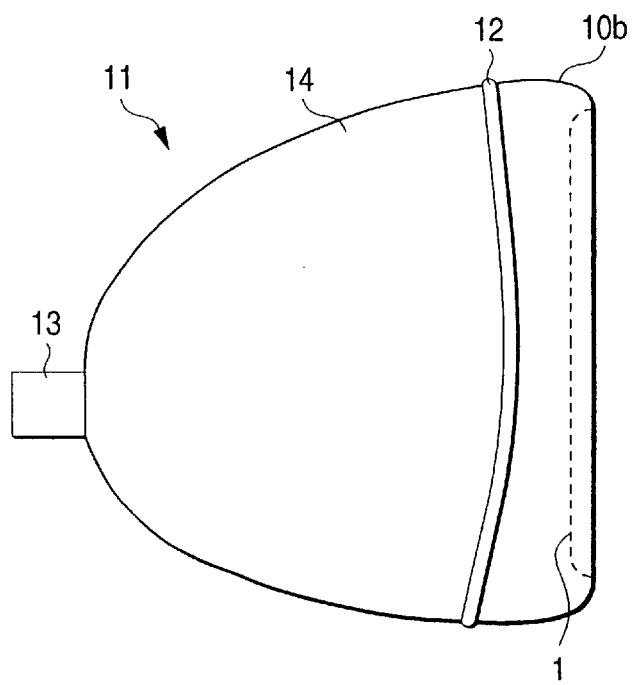
FIG. 2 is an outside view of an embodiment of the cathode-ray tube according to the present invention.

FIG. 2 is an outside view of an embodiment of the cathode-ray tube 11 of the present invention. This embodiment uses the glass article 10(b) shown in FIG. 1 (b). This glass article 10(b) has been coated inside with a fluorescent material 1 and bonded with a glass frit 12 to a funnel 14 to which an electron gun unit 13 has been fitted.

Figure 3:
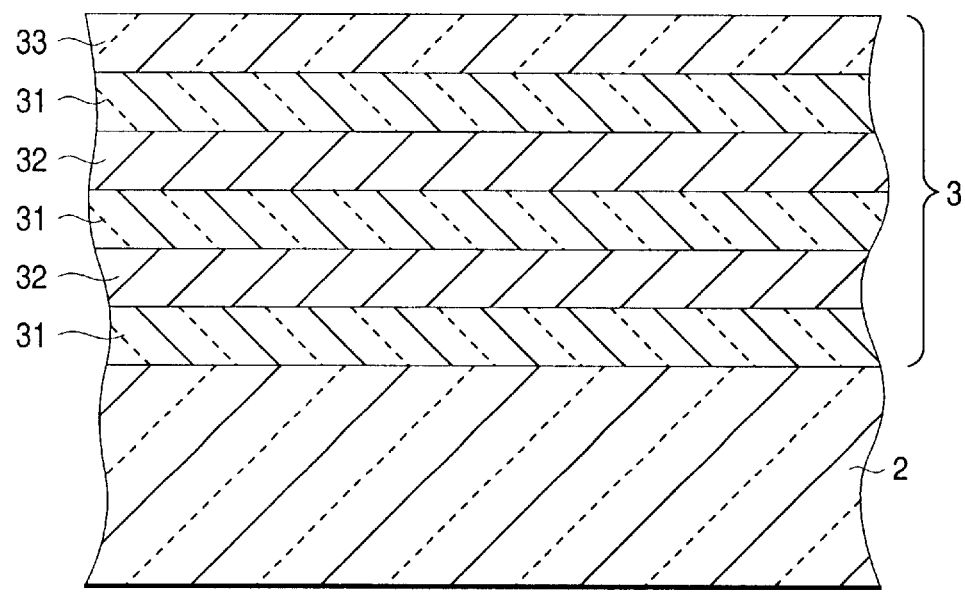
FIG. 3 is a sectional view illustrating the multilayer structure of the antireflection film in an embodiment of the optical articles according to the present invention.

FIG. 3 is a sectional view illustrating the antireflection film in an embodiment according to the present invention. This embodiment comprises a light-transmitting substrate 2 having a refractive index of 1.4 to 1.7 and, superposed on a surface thereof in this order, a transparent dielectric film 31 having a refractive index of 1.6 to 2.4, a metal film 32, a transparent dielectric film 31 having a refractive index of 1.6 to 2.4, a metal film 32, a transparent dielectric film 31 having a refractive index of 1.6 to 2.4, and a transparent dielectric film 33 having a refractive index of 1.35 to 1.5.

Figure 4:
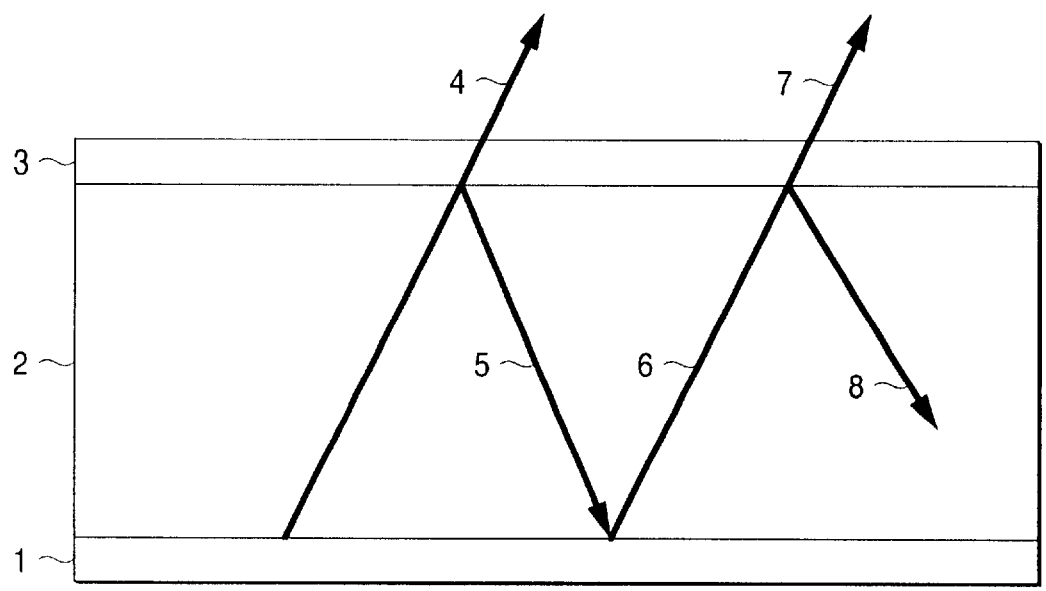
FIG. 4 is a view illustrating the principle of image doubling.
Figure 5:
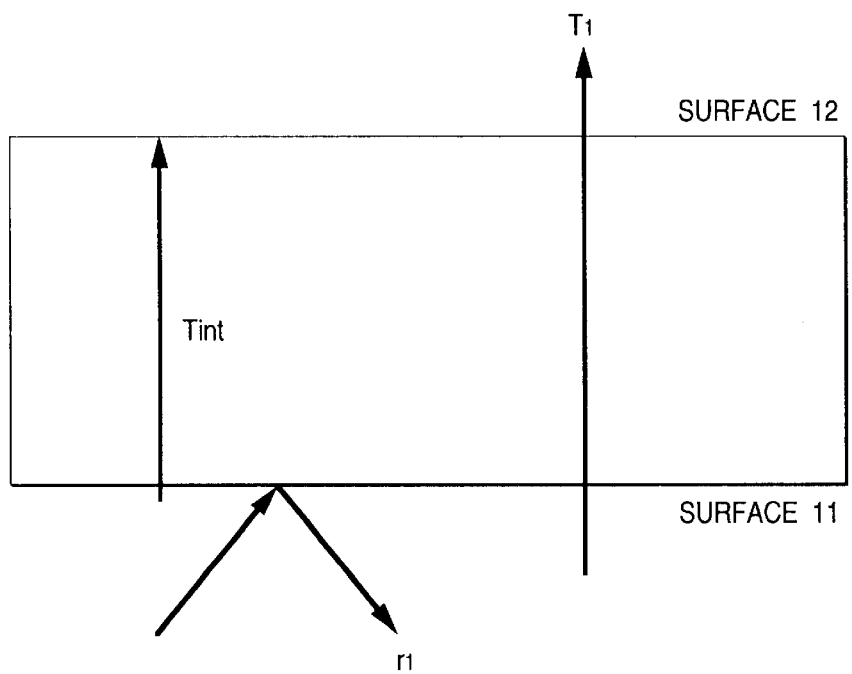
FIG. 5 is a view illustrating the $T_1$, $T_{int}$, and $r_1$, of a glass substrate.
Figure 6:
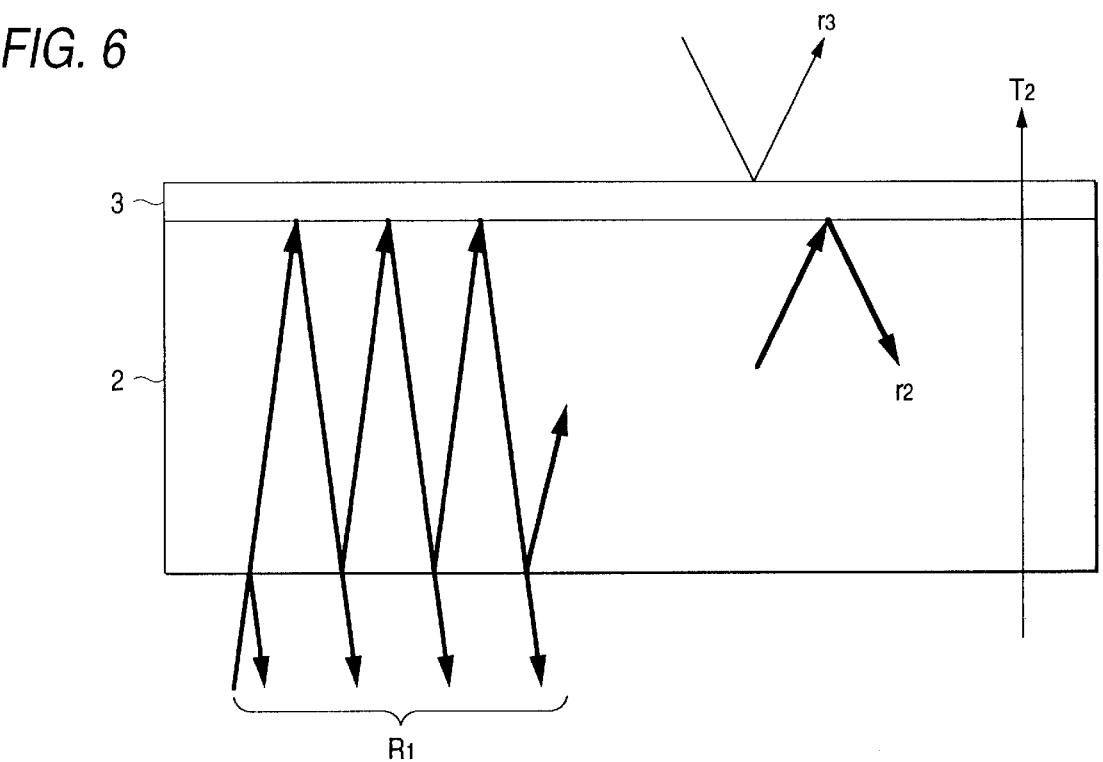
FIG. 6 is a view illustrating the $R_1$, $r_2$, and $r_3$ of an optical article according to the present invention.
Figure 7:
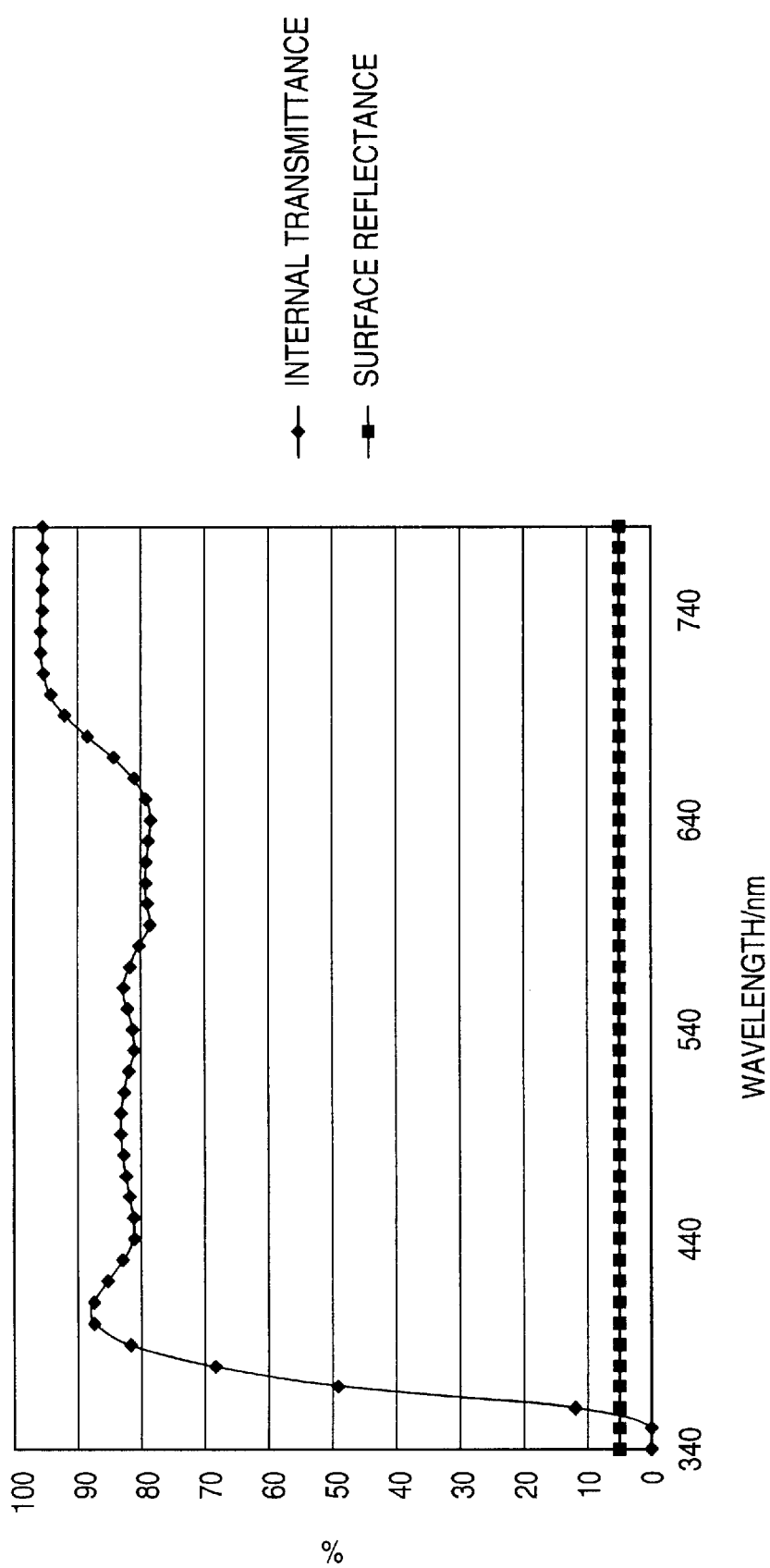
FIG. 7 is spectral curves respectively showing the internal transmittance Tint and surface reflectance $r_1$ of the glass substrate used in Example 1.
Figure 8:
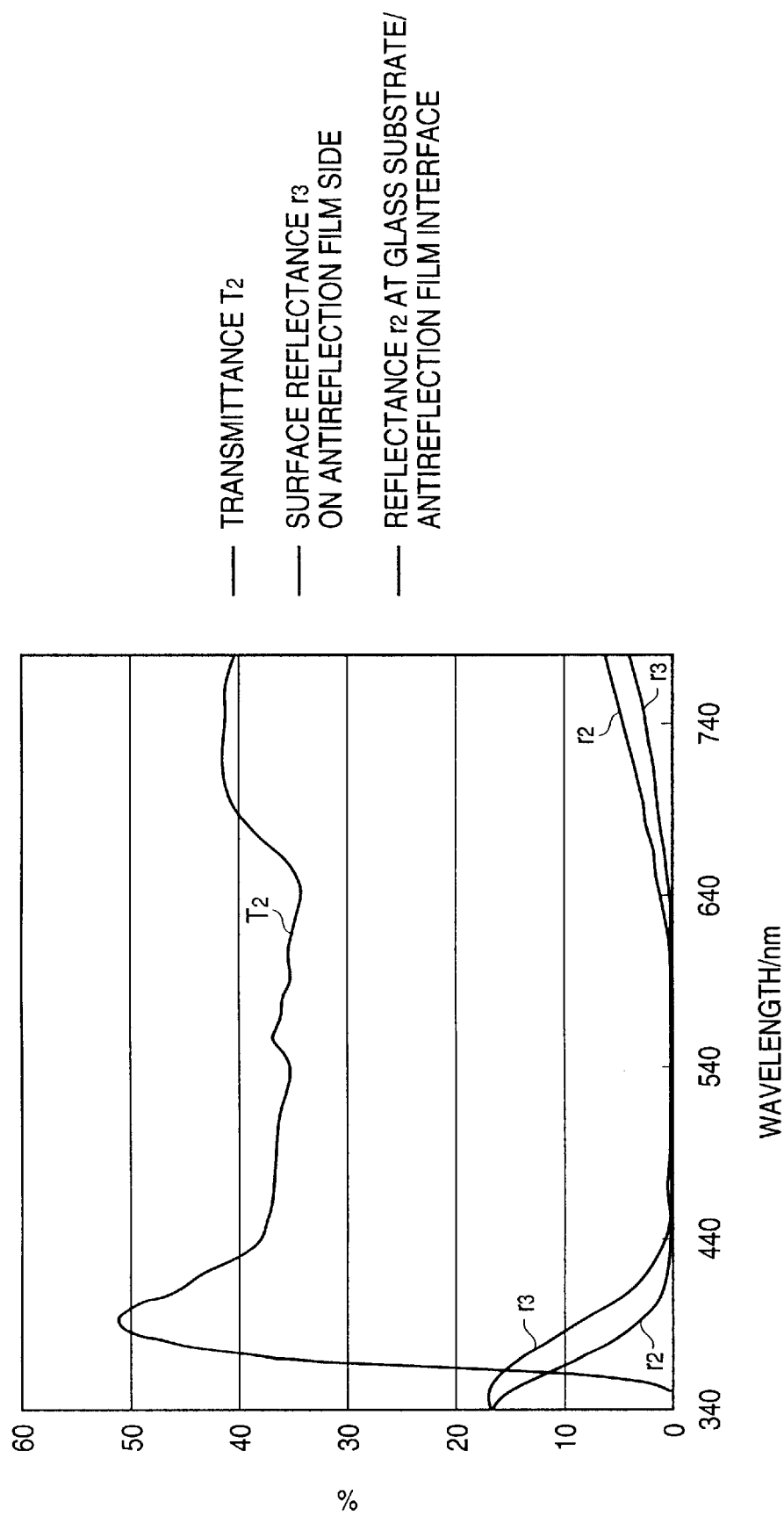
FIG. 8 is spectral curves respectively showing the transmittance $T_2$ of the optical article obtained in Example 1, the surface reflectance $r_3$ thereof on the antireflection film side, and the reflectance $r_2$ thereof at the glass substrate/antireflection film interface.

FIG. 4 is a view which optically illustrates image doubling in a display. FIG. 5 is a view illustrating the internal transmittance $T_{int}$ of a glass substrate for use in the present invention, the reflectance $r_1$ thereof on the side not having an antireflection film, and the transmittance $T_1$ thereof; these properties will be described hereinafter. FIG. 6 is a view for illustrating the reflectance $r_2$ of the light incident upon the antireflection film through the glass substrate in an optical article of the present invention, i.e., reflectance at the antireflection film/glass interface, and for illustrating the reflectance $R_1$ of the light incident upon the glass substrate through the side opposite the antireflection film. FIG. 7 is a graphic presentation showing spectral properties of the glass plate used in Example 1. FIG. 8 is a graphic presentation showing spectral properties of the optical article obtained in Example 1.

In FIG. 4, the light emitted by a fluorescent material 1 passes through a glass substrate 2a and reaches the interface between the glass substrate 2a and an antireflection film 3. Part of this light passes through the antireflection film 3 and the transmitted light 4 is viewed as an image. However, the remaining part of the light is reflected by the interface between the glass substrate 2a and the antireflection film 3 to give reflected light 5. The reflected light 5 is further reflected by the interface between the glass substrate 2a and the fluorescent material 1 to give reflected light 6. The reflected light 6 passes through the glass substrate 2a and the antireflection film 3 and reaches the viewer. The resulting transmitted light 7 can be visually observed as an image. As a result, the viewer can visually observe two lights, the transmitted light 4 and the transmitted light 7, simultaneously. Namely, the viewer observes a doubled image. The problem of image doubling thus arises.

Image doubling tends to become severer as the internal transmittance of the glass becomes higher. In contrast, in the case of a glass having a low internal transmittance, the reflected lights 5 and 6 are considerably absorbed by the glass while passing through the glass. As a result, the amount of the transmitted light 7 is so small that it cannot be observed by the viewer. Namely, image doubling does not occur.

The following definitions are used herein.
(1) Surface reflectance of a glass substrate: $r_1$
(2) Transmittance of a. glass substrate: $T_1$
(3) Internal transmittance of a glass substrate: $T_{int}$
(4) Reflectance of an optical article with respect to incidence from the side opposite the antireflection film: $R_1$
(5) Reflectance of an optical article at the glass substrate/ antireflection film interface: $r_2$
(6) Surface reflectance of an optical article on the side coated with the antireflection film: $r_3$
(7) Transmittance of an optical article: $T_2$ In the optical article of the present invention shown in FIG. 6, the reflectance $r_2$ at the glass substrate/antireflection film interface is measured by the following method. First, prior to the formation of an antireflection film, the transmittance $T_1$, of a glass substrate in the form of a plane parallel plate is measured. Subsequently, one side 12 of the glass substrate is sandblasted to make the surface "frosted" and this frosted surface is colored with a black oil-based pen (this treatment is referred to as "antireflection treatment"). Light is caused to strike on this glass substrate from the opposite side 11 to measure the reflectance. This reflectance is defined as surface reflectance $r_1$, as shown in FIG. 5. The found values of transmittance $T_1$ and surface reflectance $r_1$ for the glass substrate both obtained with a spectrophotometer are introduced into equation (1) to calculate the internal transmittance $T_{int}$ of the glass substrate. In FIG. 5 are shown the internal transmittance Tint of the glass substrate, the transmittance. $T_1$ of the glass substrate, and the surface reflectance $r_1$ of the glass substrate.

$$T_{int}=2T_1/(((1-r_1)^4+4T_1^2 \cdot r_1^2)^{0.5}+(1-r_1)^2) \quad \text{(Equation 1)}$$

Subsequently, a glass article sample prepared by depositing an antireflection film on a glass substrate having the same optical properties as the above glass substrate is examined for reflectance spectrum $R_1$ with respect to light incident on the glass substrate from the side opposite the antireflection film (see FIG. 6). Using equation (2), the reflection $r_2$ at the glass substrate/antireflection film interface in the optical article is calculated from the reflectance $R_1$ of the glass article on the side opposite the antireflection film, the surface reflectance $r_1$, of the glass substrate, and the internal transmittance $T_{int}$ of the glass substrate.

$$r_2=(R_1-r_1)/((R_1-r_1) \cdot r_1+(1-r_1)^2) \cdot T_{int}^2) \quad \text{(Equation 2)}$$

By the method described above, the reflectance $r_2$ at the glass substrate/antireflection film interface in the optical article is determined. In FIG. 6 are shown the reflectance $r_2$ at the glass substrate/antireflection film interface in the optical article and the reflectance $R_1$ of the glass article on the side opposite the antireflection film.

The present invention will be explained below in more detail by reference to the following Examples and Comparative Examples, but the invention should not be construed as being limited to these Examples. In the Examples and Comparative Examples, film deposition was conducted by the following methods.

Praseodymium titanate ($PrTiO_3$) layer: evaporation using $PrTiO_3$ pellets as an evaporation source.

Nickel-iron alloy (NiFe) layer: evaporation using a nickel-iron alloy piece as an evaporation source.

Magnesium fluoride ($MgF_2$) layer: evaporation using $MgF_2$ pellets as an evaporation source.

Stainless steel (NiFeCr) layer: evaporation using a stainless steel piece as an evaporation source.

Silicon nitride ($SiN_x$) layer: reactive sputtering using silicon as a target.

Titanium nitride ($TiN_x$) layer: reactive sputtering using titanium as a target.

Silicon dioxide ($SiO_2$) layer: sputtering using silicon as a target.

Aluminum dioxide ($Al_2O_3$) layer: sputtering using aluminum as a target.

EXAMPLE 1

A colored glass plate having dimensions of 100 mm by 100 mm by 14 mm (thickness) was examined for surface reflectance $r_1$, and transmittance $T_1$ in a wavelength range of 340 to 780 nm. These found values of transmittance and surface reflectance were introduced into the equation 1 to. calculate the internal transmittance $T_{int}$ of the glass substrate. The wavelength spectra of internal transmittance and surface reflectance are shown in FIG. 7.

Subsequently, the glass substrate whose internal transmittance and surface reflectance had been determined was placed in a vacuum evaporation system and heated to 300° C. with a substrate heater disposed in the evaporation system. While the glass substrate was maintained being thus heated, an antireflection film having the multilayer structure shown in Table 1 was deposited on the glass substrate. Thus, sample 1 of an optical article according to the present invention was produced. For vaporizing the evaporation sources, the electron beam evaporation method was used. The distance between the evaporation crucible and the glass substrate was adjusted to 100 cm, and the deposition was conducted while rotating the glass substrate. Prior to the deposition of each constituent film, the vacuum chamber was evacuated with an oil diffusion pump to a vacuum of 0.003 Pa. Oxygen gas was not introduced in depositing the nickel-iron alloy (NiFe) films, praseodymium titanate ($PrTiO_3$) films (refractive index, 2.14), and magnesium fluoride ($MgF_2$) film (refractive index, 1.38).

The optical article obtained was taken out of the evaporation system, and the NiFe films were chemically analyzed to determine the composition thereof. As a result, the Ni/Fe ratio was found to be 81:19 (by weight).

The sample obtained was examined for transmittance and for reflectance on the side opposite the antireflection film in a wavelength range of 340 to 780 nm. These found values were introduced into the equation 2 to determine the reflectance $r_2$ at the glass substrate/antireflection film interface. Furthermore, that side of the sample which was opposite the antireflection film was subjected to the antireflection treatment by means of sandblasting and a black oil-based pen, and the surface reflectance $r_3$ on the side coated with the antireflection film was then measured. In FIG. 8 are shown the thus-determined wavelength spectra of transmittance $T_2$ of the optical article, reflectance $r_2$ at the glass substrate/ antireflection film interface, and surface reflectance $r_3$ on the side coated with the antireflection film.

The visible light transmittance Tv, the visible light reflectance $r_3v$ on the side coated with the antireflection film, and the visible light reflectance $r_2v$ at the glass substrate/ antireflection film interface were calculated from the spectra shown in FIG. 8 according to JIS R 3106 (1998). The results obtained are shown in Table 2.

The outer surface of a cathode-ray tube face panel having almost the same glass composition as the glass substrate used above was coated with an antireflection film under the same film deposition conditions as the above. The resulting coated face panel as a whole had a visible light transmittance of 35.7%. This face panel was used to fabricate a cathode-ray tube, and images exhibited by this cathode-ray tube were viewed in a dark room. As a result, the display contrast was satisfactory.

Since the visible light reflectance at the interface between the face panel and the antireflection film was as low as 0.19%, image doubling did not occur. Furthermore, even when the cathode-ray tube was viewed in a room illuminated with fluorescent lamps, the face panel surface did not reflect the fluorescent lamps because the surface reflectance thereof on the side coated with the antireflection film was as low as 0.26%. Thus, the images exhibited had excellent perceptibility.

It is thought that in order for an antireflection film to have an antistatic function, the antireflection film preferably has a sheet resistance of 2 kΩ/□ or lower. It is further thought that in order for an antireflection film to shut off the electromagnetic wave emitted by cathode-ray tubes, which is harmful to the human body, the antireflection film preferably has a sheet resistance of 500 Ω/□ or lower. The sheet resistance of the antireflection film of sample 1 was measured, and the found value is shown in Table 2. The sheet resistance thereof was 112 Ω/□, showing that the antireflection film had an antistatic function and an electromagnetic shielding function.

EXAMPLE 2

The same glass substrate as in Example 1 was coated by vacuum evaporation with an antireflection film having the multilayer structure shown in Table 1. The nickel-iron-chromium alloy films used as light-absorbing films were chemically analyzed to determine the composition thereof. As a result, the Ni/Fe/Cr ratio was found to be 77.0/7.8/15.2 by weight.

The optical article sample obtained was examined for transmittance and for reflectance on the side opposite the antireflection film. From these found values was determined the visible light reflectance at the glass substrate/ antireflection film interface in the same manner as in Example 1. Furthermore, that side of the sample which was opposite the antireflection film was subjected to the antireflection treatment, and the surface reflectance on the side coated with the antireflection film was then measured.

From these measurement results were calculated the visible light transmittance Tv, the visible light reflectance $r_3v$ on the coated side, and the visible light reflectance $r_2v$ at the glass substrate/antireflection film interface according to JIS R 3106. The results obtained are shown in Table 2.

The visible light transmittance of the sample was 35.6%, which value was advantageous for enhancing display contrast. Since the surface reflectance on the side coated with the antireflection film was as low as 0.32%, almost no image reflection occurred on the coated side of the sample. Furthermore, since the reflectance at the glass substrate/ antireflection film interface was as low as 0.14%, almost no image doubling was observed.

The sheet resistance of the antireflection film was 268 Ω/□, showing that it had a practical antistatic function and a practical electromagnetic shielding function.

TABLE 1

| Example | Multilayer structure of antireflection film and thickness of each layer (nm) | | | | | | | | | | | | |
|---|---|---|---|---|---|---|---|---|---|---|---|---|---|
| Example 1 | glass | / | PrTiO$_3$ 44.9 | / | NiFe 4.9 | / | PrTiO$_3$ 53.4 | / | NiFe 3.9 | / | PrTiO$_3$ 20.6 | / | MgF$_2$ 84.7 |
| Example 2 | glass | / | PrTiO$_3$ 54.1 | / | NiFeCr 5.6 | / | PrTiO$_3$ 57.6 | / | NiFeCr 3.3 | / | MgF$_2$ 90.3 | | |
| Example 3 | glass | / | SiN$_x$ 52.1 | / | TiN$_x$ 11.1 | / | SiN$_x$ 54.9 | / | TiN$_x$ 8.5 | / | SiN$_x$ 1.2 | / | SiO$_2$ 79.2 |
| Example 4 | glass | / | SiN$_x$ 51.6 | / | TiN$_x$ 11.1 | / | SiN$_x$ 55.2 | / | TiN$_x$ 8.5 | / | SiO$_2$ 79.6 | | |
| Example 5 | glass | / | Al$_2$O$_3$ 39.5 | / | TiN$_x$ 8.0 | / | Al$_2$O$_3$ 69.8 | / | TiN$_x$ 8.4 | / | SiO$_2$ 86.4 | | |
| Example 6 | glass | / | TiO$_2$ 39.5 | / | TiN$_x$ 17.5 | / | TiO$_2$ 39.0 | / | TiN$_x$ 8.3 | / | SiO$_2$ 81.4 | | |
| Example 7 | glass | / | SiN$_x$ 31.0 | / | TiN$_x$ 10.5 | / | SiN$_x$ 50.1 | / | TiN$_x$ 10.8 | / | SiN$_x$ 20.3 | / | SiO$_2$ 60.3 |
| Example 8 | glass | / | SiN$_x$ 80.0 | / | TiN$_x$ 9.9 | / | SiN$_x$ 67.8 | / | TiN$_x$ 6.9 | / | SiO$_2$ 100.0 | | |
| Example 9 | glass | / | SiN$_x$ 60.0 | / | TiN$_x$ 10.0 | / | SiN$_x$ 60.0 | / | TiN$_x$ 10.0 | / | SiN$_x$ 100.0 | / | SiO$_2$ 100.0 |
| Example 10 | glass | / | TiN$_x$ 6.3 | / | SiN$_x$ 61.1 | / | TiN$_x$ 13.1 | / | SiN$_x$ 28.6 | / | SiO$_2$ 66.9 | | |
| Example 11 | glass | / | PrTiO$_3$ 31.9 | / | NiFe 6.4 | / | PrTiO$_3$ 61.4 | / | NiFe 3.8 | / | PrTiO$_3$ 28.8 | / | MgF$_2$ 100.0 |
| Example 12 | glass | / | PrTiO$_3$ 50.5 | / | NiFe 8.4 | / | CrO$_x$ 47.7 | / | NiFe 5.5 | / | PrTiO$_3$ 16.9 | / | MgF$_2$ 68.9 |
| Example 13 | glass | / | NiFe 4.1 | / | CrO$_x$ 60.1 | / | NiFe 9.6 | / | PrTiO$_3$ 38.9 | / | MgF$_2$ 60.5 | | |

EXAMPLE 3

A glass having the same optical properties as that used in Example 1 was coated by magnetron sputtering with an antireflection film having the multilayer structure shown in Table 1. The glass article obtained was examined for transmittance and for reflectance on the side opposite the antireflection film. From these found values was determined the visible light reflectance at the glass substrate/antireflection film interface. Furthermore, that side of the sample which was opposite the antireflection film was subjected to the antireflection treatment, and the surface reflectance on the side coated with the antireflection film was then measured. From these measurement results were calculated the visible light transmittance Tv, the visible light reflectance $r_3v$ on the side coated with the antireflection film, and the visible light reflectance $r_2v$ at the glass substrate/antireflection film interface according to JIS R3106. The results obtained are shown in Table 2.

The visible light transmittance of the sample was. 36.6%, which value was advantageous for enhancing display contrast. Since the surface reflectance on the side coated with the antireflection film was as low as 0.48%, almost no image reflection occurred on the coated side of the sample. Furthermore, since the reflectance at the glass substrate/antireflection film interface was as low as 0.23%, almost no image doubling was observed. The sheet resistance of the antireflection film was 182 Ω/□, showing that it had a practical antistatic function and a practical electromagnetic shielding function.

EXAMPLES 4 TO 10

Optical article samples were obtained by coating a glass substrate with an antireflection film having each of the multilayer structures shown in Table 1 in the same manner as in Example 3. The optical performances and sheet resistances of these samples are shown in Table 2. Each sample had a visible light transmittance in the range of 35 to 40%, which value was advantageous for enhancing display contrast. The surface reflectance of each sample on the side coated with the antireflection film was as low as 1% or below, so that almost no image reflection occurred on the coated side of the sample. The visible light reflectance of each sample at the glass substrate/antireflection film interface was as low as 1% or below, so that almost no image doubling was observed. Furthermore, the sheet resistance of the antireflection film in each sample was 208 Ω/□ or lower, which value was sufficiently low from the standpoints of antistatic function and electromagnetic shielding function.

TABLE 2

| Example | Visible light transmittance Tv(%) | Visible light reflectance $r_3v$(%) | Visible light reflectance at interface, $r_2v$(%) | Sheet resistance (Ω/□) |
| --- | --- | --- | --- | --- |
| Example 1 | 35.7 | 0.26 | 0.19 | 112 |
| Example 2 | 35.6 | 0.32 | 0.14 | 268 |
| Example 3 | 36.6 | 0.48 | 0.23 | 182 |
| Example 4 | 36.6 | 0.47 | 0.23 | 196 |
| Example 5 | 36.7 | 0.64 | 0.52 | 201 |
| Example 6 | 36.5 | 0.76 | 0.29 | 135 |
| Example 7 | 34.6 | 0.35 | 0.70 | 164 |
| Example 8 | 40.0 | 0.93 | 0.54 | 208 |
| Example 9 | 35.0 | 0.62 | 0.68 | 175 |
| Example 10 | 38.0 | 0.39 | 0.67 | 185 |
| Example 11 | 31.4 | 0.21 | 2.61 | 98 |
| Example 12 | 39.2 | 0.38 | 1.77 | 330 |
| Example 13 | 38.9 | 0.69 | 1.25 | 420 |

Note) The values of Tv, $r_3v$, and $r_2v$ were obtained from the found values of properties (5), (6), and (7) defined above by calculation using luminous characteristics as defined in JIS R 3106.

EXAMPLE 11

An antireflection film having the multilayer structure shown in Table 1 was deposited in the same manner as in Example 1. The optical performances of this sample are shown in Table 2. This sample had a transmittance of 35 to 40%, which value was advantageous for enhancing display contrast. The surface reflectance of the sample on the side coated with the antireflection film was as low as 1% or below, so that almost no image reflection occurred on the coated side of the sample. The reflectance of the sample at the glass substrate/antireflection film interface was as low as 3% or below, so that almost no image doubling was observed.

The sheet resistance of the antireflection film in this sample was 98 Ω/□ or lower, which value was sufficiently low from the standpoints of antistatic function and electromagnetic shielding function.

EXAMPLE 12

An antireflection film having the same multilayer structure as in Example 11 was deposited, except that the third layer was constituted of chromium oxide in place of praseodymium oxide. The sample obtained had properties satisfactory in accomplishing the objects of the invention, as shown in Table 2. This sample had the spectral transmission characteristics shown in FIG. 9. As shown in FIG. 9, the curve of transmittance $T_2$ was free from the tendency to rise with increasing wavelength as in the transmission curve shown in FIG. 8, and was nearly flat in the visible region. This is thought to be attributable to the fact that chromium oxide is effective in canceling out the light absorption by the nickel-iron alloy film which is more intense at longer wavelengths than at shorter wavelengths.

EXAMPLE 13

An optical article sample was obtained which had the multilayer structure shown in Table 1. The antireflection film in this sample had a sheet resistance of 420 Ω/□, which value was sufficiently low from the standpoints of antistatic function and electromagnetic shielding function, as, in Example 12. The results further show that the sample was reduced in reflection. Like the sample obtained in Example 12, this sample had a transmittance curve which was flat in the visible region.

COMPARATIVE EXAMPLES 1 TO 6

Antireflection films respectively having the multilayer structures shown in Table 3 were deposited respectively on glass substrates which were the same as that used in Example 1. In Comparative Examples 1 to 3, magnetron sputtering was used for the antireflection film deposition in the same manner as in Example 3. In Comparative Examples 4 to 6, vacuum evaporation was used for the antireflection film deposition in the same manner as in Example 1.

The optical performances and sheet resistances of the comparative samples obtained are shown in Table 4. Each comparative sample had a visible light transmittance in the range of 25 to 65%, and was satisfactory in display contrast when used as the face panel of a cathode-ray tube. However, in each comparative sample, at least either of the surface reflectance on the side coated with the antireflection film and the reflectance at the glass substrate/antireflection film interface was 1% or higher. Namely, one or both of the reflection of fluorescent lamps and display image doubling occurred in each of the comparative samples. In other words, none of the comparative samples was free from the reflection of external light and image doubling. The comparative samples were thus found to be unsuitable for practical use.

ing a given refractive index, a second light-absorbing film, and a low-refractive-index transparent dielectric film having a given refractive index. In addition, a high-refractive-index transparent dielectric film having a given refractive index is interposed between the glass substrate and the first light-absorbing film and/or between the second light-absorbing film and the low-refractive-index transparent dielectric film. Due to this constitution, the light which has passed through the light-transmitting substrate and strikes on the interface between the light-transmitting substrate and the antireflection film shows a low reflectance at the interface. Consequently, by disposing either of the optical articles of the present invention on the display surface of a cathode-ray tube, high-contrast display images can be obtained without causing image doubling.

When the light-absorbing films each is a film of one member or a mixture of two or more members selected from the group of metals consisting of titanium, chromium, zirconium, molybdenum, iron, niobium, tantalum, hafnium, nickel, nickel-iron alloys, and stainless steels, then light absorbing properties advantageous for enhancing the con-

TABLE 3

| Example | Multilayer structure of antireflection film and thickness of each layer (nm) | | | | | | | | | | |
|---|---|---|---|---|---|---|---|---|---|---|---|
| Comparative Example 1 | glass | / | $TiN_x$ 21.5 | / | $SiN_x$ 41.3 | / | $SiO_2$ 40.2 | | | | |
| Comparative Example 2 | glass | / | $SiN_x$ 72.7 | / | $TiN_x$ 11.3 | / | $SiN_x$ 3.8 | / | $SiO_2$ 82.4 | | |
| Comparative Example 3 | glass | / | $SiN_x$ 24.9 | / | $TiN_x$ 2.1 | / | $SiN_x$ 19.8 | / | $TiN_x$ 2.1 | / $SiN_x$ 124.2 | / $SiO_2$ 116.1 |
| Comparative Example 4 | glass | / | NiFe 1.3 | / | $PrTiO_3$ 39.6 | / | NiFe 3.4 | / | $MgF_2$ 110.7 | | |
| Comparative Example 5 | glass | / | $SiO_2$ 40.2 | / | NiFe 2.9 | / | $SiO_2$ 92.4 | / | NiFe 3.0 | / $SiO_2$ 29.5 | / $MgF_2$ 95.8 |
| Comparative Example 6 | glass | / | $TiO_2$ 39.5 | / | NiFe 7.6 | / | $TiO_2$ 52.1 | / | NiFe 5.6 | / $TiO_2$ 86.3 | / $PrTiO_3$ 67.6 |

TABLE 4

| Example | Visible light transmittance $Tv(\%)$ | Visible light reflectance $r_3v(\%)$ | Visible light reflectance at interface, $r_2v(\%)$ | Sheet resistance ($\Omega/\square$) |
|---|---|---|---|---|
| Comparative Example 1 | 37.2 | 0.45 | 25.4 | 150 |
| Comparative Example 2 | 54.3 | 4.06 | 1.43 | 320 |
| Comparative Example 3 | 64.2 | 1.56 | 1.43 | 2100 |
| Comparative Example 4 | 48.3 | 4.98 | 2.10 | 101 |
| Comparative Example 5 | 35.8 | 1.37 | 0.34 | 164 |
| Comparative Example 6 | 26.3 | 6.30 | 1.38 | 74 |

Note) The values of Tv, $r_3v$, and $r_2v$ were obtained from the found values of properties (5), (6), and (7) defined above by calculation using luminous characteristics as defined in JIS R 3106.

The optical articles of the present invention have high absorbing properties and a low reflectance in the visible region because the antireflection film deposited on the glass substrate has a basic multilayer structure comprising, in this order from the glass substrate side, a first light-absorbing film, a high-refractive-index transparent dielectric film havtrast of display images exhibited by a cathode-ray tube can be imparted to the optical article. In addition, due to the conductivity of these light-absorbing films, antistatic properties and electromagnetic shielding properties can also be imparted.

When the light-absorbing films each is a film of one member or a mixture of two or more members selected from the group of metal nitrides consisting of titanium nitride, chromium nitride, zirconium nitride, hafnium nitride, and tantalum nitride, then light absorbing properties advantageous for enhancing the contrast of display images exhibited by a cathode-ray tube can be imparted to the optical article. In addition, due to the conductivity of these light-absorbing films, antistatic properties and electromagnetic shielding properties can also be imparted.

When the light-transmitting substrate used in the present invention. is constituted of a colored glass containing a coloring ingredient, image doubling can be prevented more effectively.

The cathode-ray tube in which the display area is covered with either of the optical articles of the present invention does not reflect external light and can exhibit high-contrast images without causing image doubling.

While the invention has been described in detail and with reference to specific embodiments thereof, it will be apparent to one skilled in the art that various changes and modifications can be made therein without departing from the spirit and scope thereof.

What is claimed is:

1. An optical article having an antireflection coating, which comprises a light-transmitting substrate having a refractive index of 1.4 to 1.7, and an antireflection film comprising superposed layers comprising, formed on the light-transmitting substrate in this order, a light-absorbing film as a first layer, a transparent dielectric film having a refractive index of 1.6 to 2.4 as a second layer, a light-absorbing film as a third layer, a transparent dielectric film having a refractive index of 1.6 to 2.4 as a fourth layer, and a transparent dielectric film having a refractive index of 1.35 to 1.5 as a fifth layer.

2. The optical article having an antireflection coating as claimed in claim 1, wherein the transparent dielectric films respectively as the second and fourth layers each have a thickness of 30 to 80 nm, and the transparent dielectric film as the fifth layer has a thickness of 60 to 100 nm.

3. The optical article having an antireflection coating as claimed in claim 1, wherein the light-absorbing films each are a film comprising at least one metal selected from the group consisting of titanium, chromium, zirconium, molybdenum, iron, niobium, tantalum, hafnium, nickel, nickel-iron alloys, and stainless steels.

4. The optical article having an antireflection coating as claimed in claim 3, wherein the light-absorbing films each has a thickness of 5 to 18 nm.

5. The optical article having an antireflection coating as claimed in claim 1, wherein at least one of the transparent dielectric films having a refractive index of from 1.6 to 2.4 is a film of chromium oxide.

6. The optical article having an antireflection coating as claimed in claim 1, wherein the light-absorbing films each are a film comprising at least one metal nitride selected from the group consisting of titanium nitride, chromium nitride, zirconium nitride, hafnium nitride, and tantalum nitride.

7. The optical article having an antireflection coating as claimed in claim 6, wherein the light-absorbing films each have a thickness of from 3 to 6 nm.

8. An optical article having an antireflection coating, which comprises a light-transmitting substrate having a refractive index of 1.4 to 1.7, and an antireflection film comprising superposed layers comprising, formed on the light-transmitting substrate in this order, a transparent dielectric film having a refractive index of 1.6 to 2.4 as a first layer, a light-absorbing film as a second layer, a transparent dielectric film having a refractive index of 1.6 to 2.4 as a third layer, a light-absorbing film as a fourth layer, and a transparent dielectric film having a refractive index of 1.35 to 1.5 as a fifth layer.

9. The optical article having an antireflection coating as claimed in claim 8, which further has, as a sixth layer, a transparent dielectric film having a refractive index of 1.6 to 2.4 interposed between the light-absorbing film as the fourth layer and the transparent dielectric film as the fifth layer.

10. The optical article having an antireflection coating as claimed in claim 8, wherein the transparent dielectric films respectively as the first and third layers each have a thickness of 30 to 80 nm, and the transparent dielectric film as the fifth layer has a thickness of 60 to 100 nm.

11. The optical article having an antireflection coating as claimed in claim 9, wherein the transparent dielectric film as the sixth layer has a thickness not exceeding 100 nm.

12. The optical article having an antireflection coating as claimed in claim 8, wherein the light-absorbing films each are a film comprising at least one metal selected from the group consisting of titanium, chromium, zirconium, molybdenum, iron, niobium, tantalum, hafnium, nickel, nickel-iron alloys, and stainless steels.

13. The optical article having an antireflection coating as claimed in claim 12, wherein the light-absorbing films each have a thickness of 3 to 6 nm.

14. The optical article having an antireflection coating as claimed in claim 12, wherein at least one of the transparent dielectric films having a refractive index of 1.6 to 2.4 is a film of chromium oxide.

15. The optical article having an antireflection coating as claimed in claim 8, wherein the light-absorbing films each are a film comprising at least one metal nitride selected from the group consisting of titanium nitride, chromium nitride, zirconium nitride, hafnium nitride, and tantalum nitride.

16. The optical article having an antireflection coating as claimed in claim 15, wherein the light-absorbing films each have a thickness of 5 to 18 nm.

17. The optical article having an antireflection coating as claimed in claim 1 or 8, wherein the light-transmitting substrate is a glass substrate.

18. The optical article having an antireflection coating as claimed in claim 17, wherein the light-transmitting substrate is a face panel made of glass for a cathode-ray tube.

19. The optical article having an antireflection coating as claimed in claim 17, wherein the light-transmitting glass substrate contains a coloring ingredient to thereby have light absorbing properties.

20. A cathode-ray tube using the optical article having antireflection coating as claimed in claim 1 or 8.

* * * * *